(12) United States Patent
Weller et al.

(10) Patent No.: US 7,699,321 B2
(45) Date of Patent: Apr. 20, 2010

(54) CLAMPING DEVICE AND METHOD FOR THE PRODUCTION OF A CLAMPING DEVICE

(75) Inventors: Hans-Michael Weller, Affalterbach (DE); Attilio Mandarello, Affalterbach (DE)

(73) Assignee: Hainbuch GmbH Spannende Technik (DE)

( * ) Notice: Subject to any disclaimer, the term of this patent is extended or adjusted under 35 U.S.C. 154(b) by 226 days.

(21) Appl. No.: 11/787,034

(22) Filed: Apr. 13, 2007

(65) Prior Publication Data

US 2007/0210537 A1 Sep. 13, 2007

Related U.S. Application Data

(63) Continuation of application No. PCT/EP2005/010946, filed on Oct. 12, 2005.

(30) Foreign Application Priority Data

Oct. 15, 2004 (DE) .................. 10 2004 050 967

(51) Int. Cl.
   *B23B 31/20* (2006.01)
(52) U.S. Cl. ................. 279/43.7; 279/46.7; 279/53
(58) Field of Classification Search ............. 279/43.7, 279/43.8, 46.7, 46.8, 51–53; *B23B 31/20*
See application file for complete search history.

(56) References Cited

U.S. PATENT DOCUMENTS

| | | | | |
|---|---|---|---|---|
| 2,525,646 A | * | 10/1950 | Burg | 279/16 |
| 2,563,464 A | * | 8/1951 | Green | 279/20.1 |
| 2,676,561 A | * | 4/1954 | Shaffer | 118/708 |
| 2,791,433 A | * | 5/1957 | Dodd | 279/79 |
| 2,877,022 A | * | 3/1959 | Parker et al. | 279/2.03 |
| 3,463,048 A | * | 8/1969 | Owsen | 409/141 |
| 3,539,193 A | * | 11/1970 | Parsons | 279/51 |
| 3,791,660 A | * | 2/1974 | Bostley | 279/20 |
| 3,815,930 A | * | 6/1974 | Mattes | 279/50 |
| 4,214,766 A | * | 7/1980 | Rall et al. | 279/46.7 |
| 4,640,517 A | * | 2/1987 | Lovatt | 279/2.04 |
| 4,690,415 A | * | 9/1987 | Holdridge | 279/4.09 |
| 4,856,797 A | * | 8/1989 | Rall | 279/46.7 |
| 4,858,938 A | * | 8/1989 | Terwilliger et al. | 279/57 |
| 4,971,340 A | | 11/1990 | Rall | |
| 5,029,881 A | * | 7/1991 | Godfrey | 279/57 |
| 5,160,150 A | * | 11/1992 | Schmidt | 279/58 |
| 5,324,050 A | * | 6/1994 | Kanaan | 279/46.7 |

(Continued)

FOREIGN PATENT DOCUMENTS

DE 3535601 A1 * 4/1987

(Continued)

*Primary Examiner*—Eric A Gates
(74) *Attorney, Agent, or Firm*—Akerman Senterfitt

(57) ABSTRACT

A chuck for accommodating a collet chuck, comprising a housing and a chucking tool seat that is assigned to the housing. The chucking tool seat is embedded in the housing as a separate part via an intermediate filling that is made of polymer concrete for connecting the chucking tool seat and the housing. This design has improved properties regarding damping and the total weight while flat sub-areas that are composed of individual guiding plates can additionally be used as clamping areas of the chucking tool seat. Thus a pyramid-type joint is obtained, which could previously be created with the required precision only by using a lot of effort when producing the same from solid material.

28 Claims, 4 Drawing Sheets

U.S. PATENT DOCUMENTS

| | | | |
|---|---|---|---|
| 5,382,030 A * | 1/1995 | Kanaan | 279/46.7 |
| 5,549,308 A | 8/1996 | Bennett | |
| 5,636,851 A * | 6/1997 | Kanaan | 279/46.7 |
| 5,641,168 A * | 6/1997 | Kanaan | 279/46.7 |
| 5,788,249 A | 8/1998 | Tagami | |
| 5,911,421 A * | 6/1999 | Steele | 279/46.9 |
| 6,575,477 B2 * | 6/2003 | Humphrey et al. | 279/46.7 |
| 6,726,221 B2 * | 4/2004 | Terwilliger et al. | 279/50 |
| 6,908,086 B2 | 6/2005 | Rall | |
| 7,044,478 B2 * | 5/2006 | Mantovani | 279/8 |
| 2004/0051257 A1 * | 3/2004 | Rall | 279/43.7 |

FOREIGN PATENT DOCUMENTS

| | | |
|---|---|---|
| DE | 10011868 A1 * | 9/2001 |
| DE | 101 15 864 C1 | 10/2002 |
| DE | 102 34 603 A1 | 2/2004 |
| JP | 2002126919 A * | 5/2002 |
| JP | 2002370108 A * | 12/2002 |
| JP | 2004114298 A * | 4/2004 |

* cited by examiner

CLAMPING DEVICE AND METHOD FOR THE PRODUCTION OF A CLAMPING DEVICE

FIELD OF APPLICATION AND PRIOR ART

The invention relates to a chucking device, particularly a chuck for receiving a collet chuck, having a housing and a chucking tool receptacle associated with the housing, as well as a method for the manufacture of a chucking device.

A known chucking device according to U.S. Pat. No. 6,908, 086 makes it possible to receive a chuck constructed as a closer. The chucking device has a substantially cylindrical chuck body, in which is provided a chucking tool receptacle integrally joined to the chuck body. On said chuck body is provided a spindle flange as a connecting member between the chucking device and a machine spindle of a machining machine and which is in particular provided for a force-transferring operative connection to a drive mechanism of the machining machine. The chucking device and chuck have corresponding internal/external geometries, so as to permit a form-closed reception of the chuck in the chucking tool receptacle of the chucking device. On the chucking tool receptacle is provided a conical internal geometry constructed for receiving the conically constructed external geometry of the chuck. The chuck has several, elastically interconnected jaws for receiving a workpiece and on introducing an operating force on the chuck by means of the corresponding internal and external geometry clamping forces are exerted on the workpiece.

The known chucking device is more particularly provided for the clamping of workpieces for cutting-based machining processes, such as can be performed during turning or cutting machining by means of a machining machine. Accompanying the rising demands concerning precision of the clamping process to be performed with the chucking device, as well as a machining speed and cutting rate during machining by means of the machining machine, ever increasing demands are made on the chucking devices. These demands are further increased by the rising use of minimum quantity lubrication or dry machining processes.

PROBLEM AND SOLUTION

The problem of the invention is to provide a chucking device and a manufacturing method for the same, which permit a simplified manufacture and an improved adaptation to the requirements of workpiece machining methods and which in particular has an improved construction.

This problem is solved by a chucking device having the features of claim 1 and a chucking device manufacturing method having the features of claim 25. Advantageous and preferred developments of the invention are given in the further claims and are explained in greater detail hereinafter. By express reference the wording of the claims is made into part of the content of the description. Features describing the chucking device and the manufacturing method are in part only described once hereinafter. However, independently thereof, they apply both to the chucking device and to the manufacturing method.

According to the invention the chucking tool receptacle is in the form of a separate component and is connected by connecting means to the housing. Through a construction as a separate component the chucking tool receptacle can be manufactured separately from the housing, which permits the use of different manufacturing methods and materials for the chucking tool receptacle and for the housing. The chucking tool receptacle can be constructed in one or more pieces, so that a particularly advantageous adaptation can be obtained to the demands of the workpiece to be chucked or to the requirements with respect to the machining processes used. The connecting means more particularly provided for a force-transferring operative connection of the chucking tool receptacle with the housing, by separate or different design can also be adapted with respect to their characteristics and coupling action between housing and chucking tool receptacle to specific requirements with respect to the workpieces to be clamped or chucked specific requirements with respect to the workpieces to be clamped or chucked with the chucking device and the machining processes to be performed.

In a development of the invention a connecting means material has a higher damping and/or a lower density than a material of the housing and/or the chucking tool receptacle. As a result the force peaks occurring during workpiece machining and introduced into the workpiece and the chuck operatively connected thereto and the resulting vibrations are not transferred directly into the housing and therefore to the machining machine. Instead the necessary damping of these vibrations can be brought about by a suitable choice of the connecting means material and optionally a corresponding design of the connecting means. Damping is in particular brought about by an internal friction of the connecting means material. Particularly in the case of machining processes such as hard turning, in which a particularly hard and possibly brittle workpiece is to be machined, force peaks and resulting vibrations occur. These can have a negative influence on the life of drives and bearings of the machining machine. A damping of the force peaks by means of the chucking device unburdens the machining machine in a simple manner.

As a result of a lower density of the connecting means material compared with that of the materials of the housing and/or the chucking tool receptacle, a chucking device weight reduction can be brought about. This is advantageous for the dynamics of the machining machine with respect to acceleration and deceleration processes for the workpiece to be received in the chucking device. This can also lead to a positive influence of the chucking device on the bearings and drives, because a lower chucking device weight leads to low force effects on the machining machine.

According to a further development of the invention the housing and/or the chucking tool receptacle surround the connecting means in a substantial and in particular radially encircling construction. This leads to an advantageous, force-transferring supporting of the connecting means on the housing and/or chucking tool receptacle. There is in particular a direct force flux between the housing, chucking tool receptacle and connecting means. Such a supporting action and a corresponding force flux permit a particularly advantageous choice of connecting means material and an optimized design of the connecting means, particularly with respect to the geometry thereof. This leads to a wide margin for adaptation of the connecting means and the complete chucking device to the requirements of the machining processes to be performed.

In a further development of the invention the chucking tool receptacle is terminated in a substantially flush manner with an end face formed by the connecting means and/or the housing. This ensures a particularly advantageous force flux between the chucking tool receptacle and the housing via the connecting means. Forces occurring during a machining process of a workpiece received in the chucking device and introduced via the collet chuck onto the chucking tool receptacle and having components orthogonal to a median longitudinal axis of the chucking device or torques which at least do not act exclusively about the median longitudinal axis of the chucking device, must be supported on the housing via the connecting means. If the chucking tool receptacle projected over an end face formed by the connecting means or the housing an additional lever arm would arise between the chucking tool receptacle and the housing, which would lead to higher supporting forces for the forces and torques, so that the connecting means would have to be thickened or reinforced.

In a further development of the invention the connecting means are at least substantially formed by a non-metallic material. As a result it is possible to have particularly advantageous characteristics of the connecting means with respect to their density and damping in a wide range corresponding to the demands made on the chucking device. The non-metallic materials can in particular be plastics, plastics filled with artificial and/or natural fibres, natural materials and combinations thereof.

In a preferred development of the invention the non-metallic material is polymer concrete or cast mineral, referred to in general terms hereinafter as polymer concrete. Polymer concrete is a material comprising mineral fillers such as granite, basalt, chalk, quartz gravel, quartz sand or stone dust in each case different particle size ranges and a small proportion of general reaction resins such as epoxy resin or other binders. The material is mixed and is moulded or cast cold as a homogeneous mass. Polymer concrete is in particular characterized compared with other materials, such as for example plastics, by the fact that it has a particularly low and therefore advantageous shrinkage behaviour during hardening. On passing from a liquid or pasty aggregate state in which processing can advantageously take place into a solid aggregate state there is virtually no shrinkage of polymer concrete. Thus, on embedding components in polymer concrete there is a particularly advantageous, integral binding or joining of said components. The density of polymer concrete is significantly lower than that of materials conventionally used in the manufacture of chucking devices and in particular metals. The at least temporary pasty or liquid consistency of polymer concrete permits integral casting in and/or of components. As the density of steel is just 8 g/cm3 and that of polymer concrete just above 2 g/cm$^3$, a weight saving is possible in addition to the advantageous vibration characteristics and shrinkage behaviour.

According to a further development of the invention the chucking tool receptacle is constructed on an outer contour and/or the housing on an inner contour for a form-closed connection to the connecting means. A form-closed connection ensures an advantageous force transfer via normal forces or normal force components between the housing, connecting means and chucking tool receptacle. Normal forces or normal force components can be transferred provided that the forces to be transferred between the components have an at least pro rate force component, which is oriented parallel to a surface normal on the inner contour of the housing or an outer contour of the chucking tool receptacle. In the components in question a normal force transfer occurs as a compressive force. Particularly when using polymer concrete, which can be highly loaded with respect to compressive force, this ensures a particularly advantageous force transfer. A form-closed connection can be implemented by projections, undercuts, recesses or combinations thereof. In a particularly advantageous embodiment of the invention an interlocking of the connecting means with the inner and/or outer contour is obtained. In the case of interlocking a plurality of surfaces is available and can be used for a transfer of normal forces.

In a further development of the invention an outer contour of the chucking tool receptacle and/or an inner contour of the housing is at least sectionally polygonally shaped. Thus, in a particularly advantageous manner, a form-closed connection is brought about between the housing, connecting means and chucking tool receptacle. A polygonal outer contour of the chucking tool receptacle with a sequence of uniformly or non-uniformly large, regularly or irregularly mutually oriented surface sections can be obtained in simple manner by forming or cutting machining, such as forging, milling, grinding or sawing. A polygonal construction of the inner housing contour can in particular be brought about by milling, broaching or corresponding forming or working processes.

In a further development of the invention the chucking tool receptacle has on one end side at least one supporting surface for an axial supporting with respect to the housing. This makes it possible to ensure that axial forces, such as are in particular used for clamping the chuck and which must be compensated by oppositely directed compressive forces, do not lead to undesired shearing stresses in the connecting means. In fact, a supporting surface brings about a direct supporting of the chucking tool receptacle on the housing. A gap between the supporting surface and the housing can be filled by connecting means, which are essentially subject to a compressive load action. In a particularly advantageous embodiment of the invention the supporting surface is made at least sectionally in circular ring form, so that an additional supporting of tilting moments which can act on the chucking tool receptacle is brought about.

In a further development of the invention the housing carries a relatively movable operating device for a force transfer from a machine spindle to a chuck insertable in the chucking tool receptacle. This permits a control of the chuck by operating means of the machining machine. The operating means can be operated manually or by an external force and allow an advantageous, particularly an operation of the chuck that can be automated. For this purpose the operating device can be constructed in known manner.

In a further development of the invention the chucking tool receptacle has a truncated cone-shaped inner contour, which is particularly advantageously and can be precisely manufactured by a turning process. The same applies regarding the corresponding outer contour of the collet chuck. The truncated cone-shaped inner contour also ensures an advantageous self-centring of the collet chuck relative to the chucking tool receptacle, leading to a high rotational accuracy for the clamped workpiece.

In a further development of the invention the chucking tool receptacle has a polygonal inner contour, preferably in the form of a pyramidal frustum, with at least three pyramidal frustum surfaces. As a result of a polygonal inner contour and a correspondingly designed outer contour of the collet chuck, compared with a truncated cone-shaped inner contour there is an advantageous surface contact of the collet chuck outer contour with the chucking tool receptacle. With corresponding truncated cone-shaped contours of the chucking tool receptacle and the collet chuck a surface contact between the contours is only ensured in a narrow range, whereas there is only a line contact of the contours on receiving an excessively large or small workpiece in the collet chuck.

As opposed to this, with corresponding polygonal contours of the chucking tool receptacle and the collet chuck, it is ensured that virtually independently of the workpiece received in said collet chuck, there is a surface contact of the polygonal contours permitting a particularly advantageous transfer and supporting of forces and torques. Through a lower surface pressure between the chucking tool receptacle and collet chuck resulting from the surface contact of the contours, lower wear and higher roadability are ensured. The contours place virtually no limitation on the magnitude of the forces to be transferred. As a result of the pyramidal frustum contour it is also possible to have a form-closed transfer of torques acting around the median longitudinal axis of the chucking-device. Thus, unlike in the case of a truncated cone-shaped contour, no additional measures against a relative rotation between collet chuck and chucking tool receptacle are needed. The concept of the pyramidal frustum and pyramidal frustum surfaces is not to be understood as a limitation to pyramidal contours, but instead merely serves to illustrate the substantially trapezoidal inner faces of the chucking tool receptacle or outer faces of the collet chuck. The simplest form of the pyramidal frustum is therefore a tetrahedral frustum for which in each case three pyramidal frustum surfaces are to be provided on the chucking tool receptacle and collet chuck. In a preferred embodiment of the invention the edges of the adjacent trapezoidal surfaces on the collet chuck are convexly rounded, whereas the edges of the inner contour of the chucking tool receptacle are offset with respect to one another and interconnected by a channel-like, concave recess. This brings about a particularly advantageous, tolerance-uncritical manufacture of the inner contour which, as a result of the channel-like recesses, is less susceptible to dirtying. This also avoids an undesired contact in the edge areas between the chucking tool receptacle and the collet chuck, so that here increased friction and the associated wear are reduced.

In a further development of the invention the pyramidal frustum surfaces are constructed as separate guide plates. This permits a particularly advantageous material selection and manufacture of the pyramidal frustum surfaces to be provided for the chucking tool receptacle. In an advantageous embodiment of the invention, for example in the case of a larger number of pyramidal frustum surfaces, one partial quantity can be made from a first material and a further partial quantity from a second material. The first partial quantity for example has particularly advantageous sliding characteristics and is placed in the chucking tool receptacle in such a way that initially contact takes place with the collect chuck. However, the second partial quantity which is set back somewhat compared with the first partial quantity has a high strength and consequently permits the transmission of high torques and forces.

In a further development of the invention the guide plates have lubricating ducts. Thus, when using the collet chuck, it is ensured that an adequate lubricant quantity is available between the outer contours of the collet chuck and the inner contours of the chucking tool receptacle, so that as a result of the reduced friction a particularly accurate setting of the clamping force is made possible. The guide plates can also have lubricating grooves supplied by means of the lubricating ducts. The lubricating grooves ensure that dirt particles which have been deposited on the corresponding contours are moved into the lubricating grooves on inserting the collet chuck in the chucking tool receptacle and consequently during the clamping of the workpiece are not pressed into the pyramidal frustum surfaces so as to damage the same.

In a further development of the invention the guide plates are constructed for receiving rolling bodies. It is thus possible to bring about a particularly advantageous clamping force control due to the almost hysteresis-free clamping force transfer between the chucking device and the collet chuck. The rolling bodies reduce the otherwise occurring sliding friction between the corresponding contours to a rolling friction which is much lower than the sliding friction. This particularly permits an advantageous adaptation of the clamping force acting on the collet chuck and workpiece. For example, a clamping force adjustment or possibly a clamping force control is made possible with a variable clamping force during the production process, so that during roughing work with high machining forces a workpiece can be correspondingly firmly clamped. However, during the following precision machining processes only a minimum clamping force is exerted by the chucking device on the workpiece in order to minimize deformations to the latter. To this end the rolling bodies can be firmly integrated into the guide plate or in the form of rolling body mats, i.e. rolling bodies embedded in a flexible material, are placed on the guide plates and are consequently provided between the chucking tool receptacle and collet chuck. The rolling bodies can in particular be in the form of rolling needles, which permit an advantageous force transfer as a result of line contact between the corresponding contours.

In a further development of the invention the lubricating ducts can be supplied with lubricant by means of lubrication holes in the housing, said lubrication holes being at least partly usable for fixing the guide plates during a casting process. As a result of lubrication holes in the housing a particularly advantageous, integral supply of the lubricating ducts is ensured and for this purpose no pipes have to be connected to the chucking device.

In a design of the chucking tool receptacle with guide plates, which are provided as individual parts in the chucking device housing, an orientation of the guide plates is significantly facilitated if they are connected to the housing by means of releasable or non-releasable connections. It is particularly advantageous if for this purpose use is made of holes which are in any case provided in the housing, such as is the case with the lubrication holes. A thread can be cut into the lubrication holes and into the same can be screwed fixing screws for the guide plates in order to at least temporarily fix the latter. This is of particular interest if the guide plates are to be connected to the housing by pouring in at least temporarily liquid or pasty connecting means such as for example polymer concrete.

In a further development of the invention the housing is made from a non-metallic material, preferably a plastics material and in particularly preferred manner a carbon fibre-reinforced plastics material. This reduces the housing weight and a particularly advantageous chucking device design is obtained if the housing is applied as a wound body of carbon fibre-reinforced plastics material to a spindle flange serving as the winding mandrel and is connected to the chucking tool receptacle by means of polymer concrete as the connecting means.

The method for the manufacture of a chucking device has the following steps: positioning a chucking tool receptacle relative to a housing, filling a gap between housing and chucking tool receptacle with an at least temporarily flowable connecting means material. As a result connecting means materials can be used which at least temporarily have a liquid or pasty consistency and which consequently and in advantageous manner permit a binding of the chucking tool receptacle to the housing and for example the materials mentioned hereinbefore. It is unimportant how the flowable state or the subsequent, substantially solid state of the connecting means is brought about. This can take place by melting, mixing several components or hardening through an energy supply. The positioning of the chucking tool receptacle prior to casting with respect to the housing ensures the precision necessary for the chucking device.

In a further development of the invention a positioning device is used for positioning the chucking tool receptacle relative to the housing. The positioning device permits an orientation of the chucking tool receptacle relative to the housing, particularly by self-closure. On the chucking tool receptacle and/or housing can be provided corresponding interfaces permitting an exact orientation of the positioning device.

According to a further development of the invention guide plates, which are provided for forming the chucking tool receptacle, are fixed to the positioning device. Whereas hitherto the manufacture of a chucking device provided with a pyramidal frustum-shaped chucking tool receptacle was complicated and expensive and in particular involved costly production processes such as erosion or complicated and tolerance-critically constructed designs, as a result of the at least temporarily flowable or castable connecting means, particularly using polymer concrete technology, a corresponding structure can be particularly inexpensively manufactured. The chucking tool receptacle comprises an arrangement of several guide plates, which prior to the introduction of the connecting means are arranged in pyramidal frustum-like manner with a positioning device and are subsequently backcast. An advantageous handling of the guide plates is brought about by the prefixing thereof, particularly by screwing. The guide plates are fixed to the very precisely manufactured positioning device, which consequently images its precision on the subsequent position of the guide plates in the housing. The positioning device is fixed through the oil cap, which has an internal thread and serves as a type of permanent fastening nut. The oil cup can remain in the chuck and subsequently serve as a lubricating duct to the guide plates.

In a further development of the invention the positioning device is used as a holding means for the further machining of contours of the housing and/or chucking tool receptacle. This leads to a particularly precise orientation of those geometries on the chucking device which are provided for fitting to the machine spindle and therefore greatly influence important characteristics such as the concentricity and planarity of the chucking device. These geometries are for example implemented on the spindle flange after carrying out the casting process and the resulting fixing of the guide plates and permit machining aligned with the axis of symmetry of the pyramidal frustum.

These and further features can be gathered from the claims, description and drawings and individual features, both singly and in the form of sub-combinations, can be implemented in an embodiment of the invention and in other fields and can represent advantageous, independently protectable constructions for which protection is claimed here. The sub-division of the application into individual sections and the subheadings in no way restrict the general validity of the statements made thereunder.

BRIEF DESCRIPTION OF THE DRAWINGS

Embodiments of the invention are diagrammatically illustrated in the drawings and are described in greater detail hereinafter relative to the drawings, wherein show.

DETAILED DESCRIPTION OF THE DRAWINGS

Figure 1:
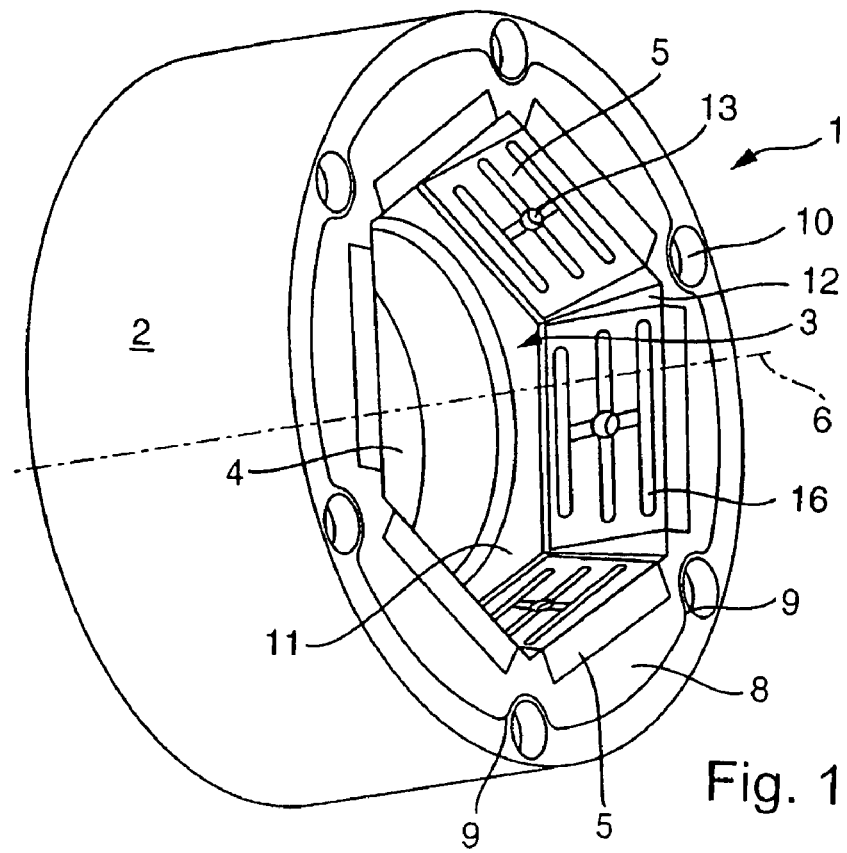
FIG. 1 A perspective view of a chucking device with a pyramidal frustum-like inner contour of the chucking tool receptacle.

A chucking device 1 has a substantially cylindrically shaped housing 2 in the form of a basic body. On said housing 2 is provided a frontal depression forming a reception area for a chucking tool receptacle 3. On an end side of housing 2 remote from the depression is provided a not shown spindle flange for coupling to a not shown machining machine spindle. The housing has a central hole 4 which can serve as a passage for a not shown, per se known operating device.

The chucking tool receptacle 3 has six substantially rectangular and therefore also trapezoidal pyramidal frustum services, which are implemented as guide plates 5. The guide plates 5 are arranged in a regular sequence and with an identical angle 7 in the reception area with respect to the median longitudinal axis 6. A force-transferring, form-closed connection between housing 2 and guide plates 5 is brought about by connecting means 8 made from polymer concrete and introduced between housing 2 and guide plates 5. To ensure an advantageous force transfer between housing 2 and guide plates 5, cylindrical sectional bulges 9 pointing in the direction of the median longitudinal axis are provided on housing 2 and are in each case frontally provided with a tapped hole 10 and permit a form-closed connection to the connecting means 8. The guide plates 5 are arranged in such a way that on five of the six sides they are in contact with the connecting means 8 and therefore also ensure a form-closed connection.

On an inner surface 11 provided in the reception area of housing 2 and which extends radially, the guide plates 5 are in flat connection with the housing 2, in order to ensure an advantageous transfer of axial forces and consequently form a supporting surface. In this way no harmful shearing stresses can act axially on the connecting means. A thin connecting means layer is provided between guide plates 5 and inner surface 11, which is used for compensating tolerances and which when using the chucking device is only subject to compressive force action. As a result of the rectangular construction of the guide plates 5 in conjunction with the regular arrangement under angle 7 to the median longitudinal axis 6, there are substantially triangular connection sections 12 between the guide plates.

In a not shown alternative embodiment of the invention the connection sections 12 are in each case implemented as channel-like, concave and substantially truncated cone-shaped areas. They consequently permit an advantageous decoupling of corner areas of a collet chuck to be inserted in the chucking tool receptacle 3.

In the case of the chucking device 1 shown in FIG. 1 in the guide plates 5 is in each case provided a lubricating duct 13, which is linked to lubricating grooves 16 and consequently permits the distribution of a lubricant passing out of lubricating duct 13 over the surface of guide plates 5. By means of an oil cup 14 lubricating duct 13 is linked with a lubrication hole 15 in housing 2. Oil cup 14 is constructed as a separate component and is cast into the housing. Besides connecting the lubricating duct 13 to lubrication hole 15 it also brings about a prefixing of guide plates 5 prior to the introduction of the connecting means. Through the separate construction of the oil cup 14, in simple manner it is possible to vary the number of guide plates 5 to be provided for the chucking tool receptacle 3. It also greatly simplifies the manufacture of the reception area to be provided in housing 2.

On an end side remote from inner surface 11, the guide plates have a flush construction with a surface formed by the end side of the housing. Connecting means 8 also do not project beyond this surface. This brings about an advantageous force flux between the guide plates 5 provided for absorbing compressive forces of a not shown collet chuck and the housing 2 by means of connecting means 8.

Figure 2:
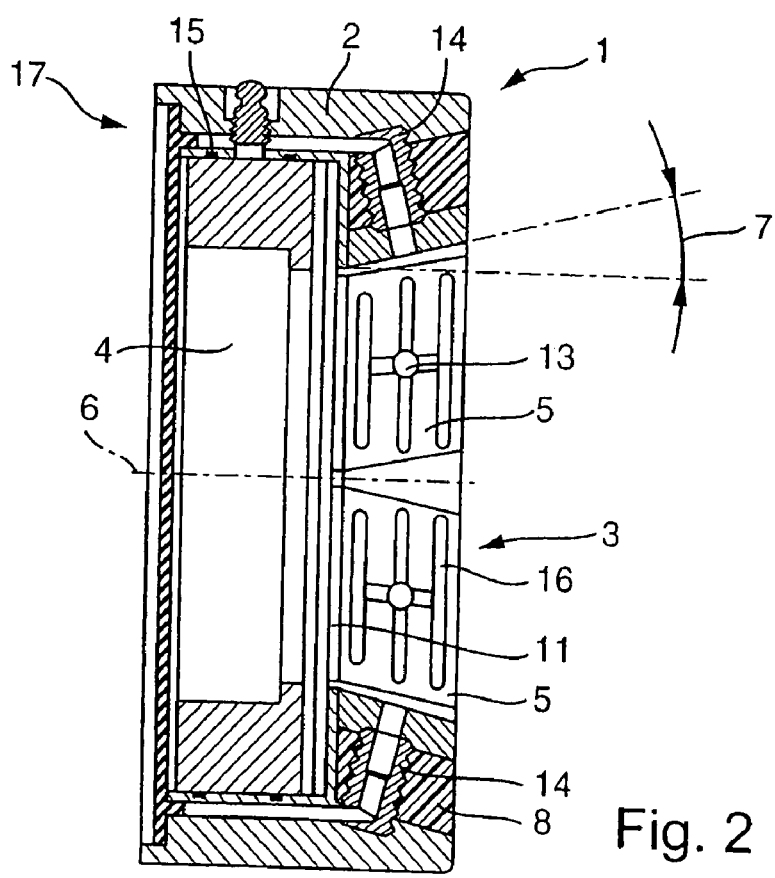
FIG. 2 A planar sectional view of the chucking device of FIG. 1.
Figure 3:
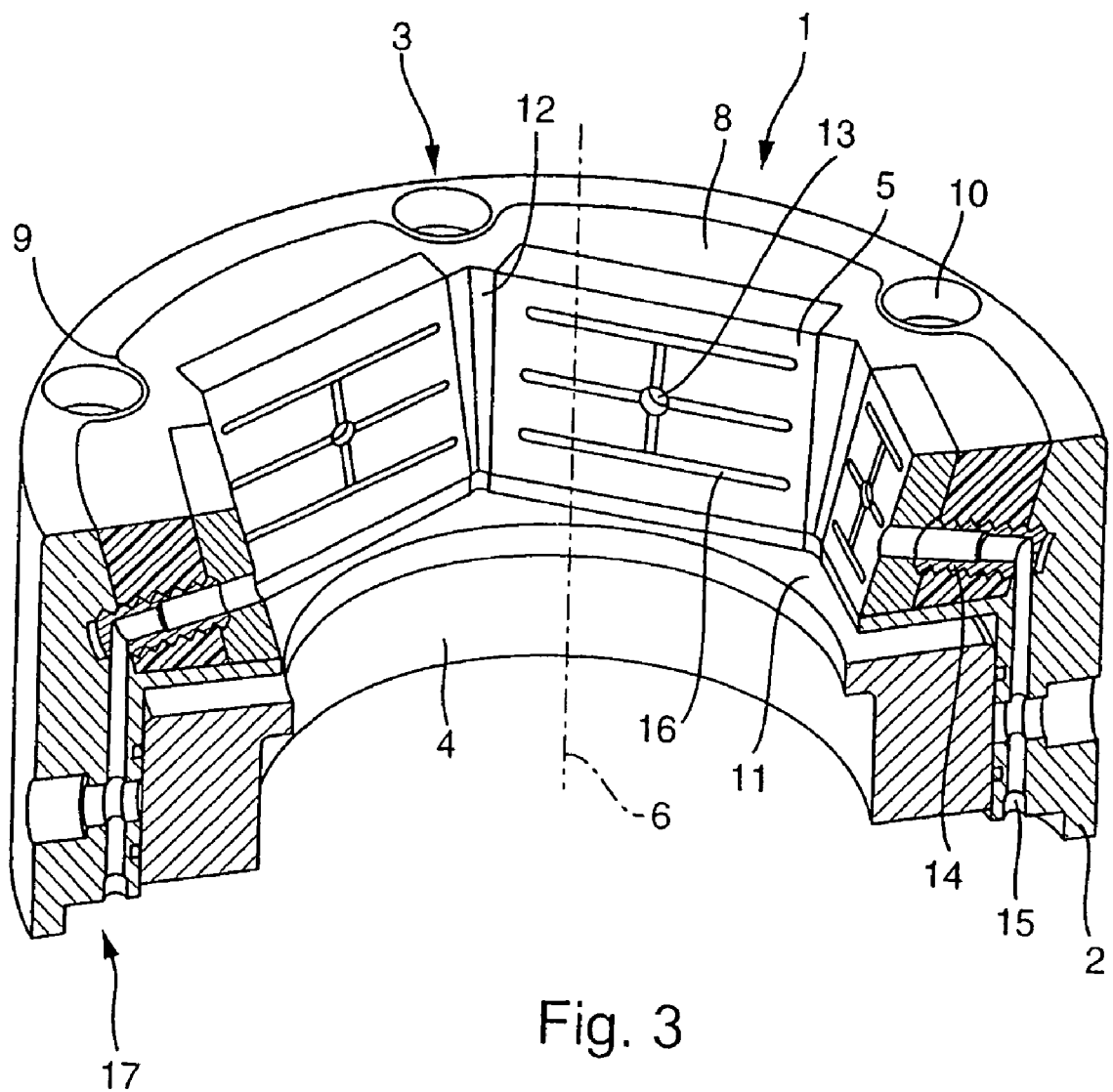
FIG. 3 A perspective view of a half-section of the chucking device of FIGS. 1 and 2.
Figure 4:
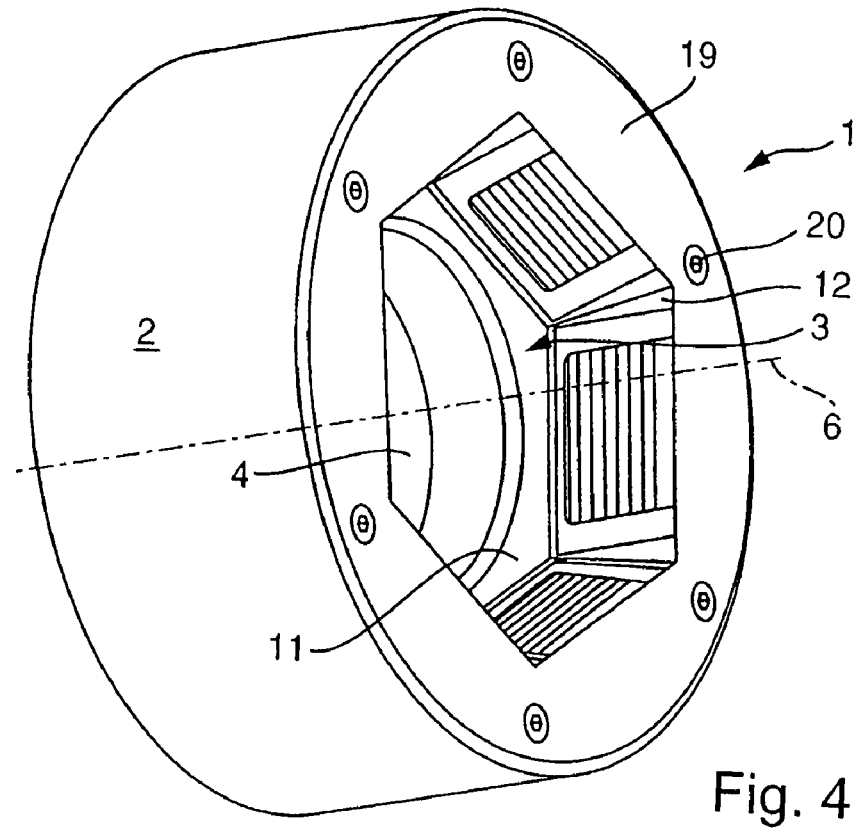
FIG. 4 perspective view of a chucking device with a pyramidal frustum-like inner contour and rolling bodies on the guide surfaces.
Figure 5:
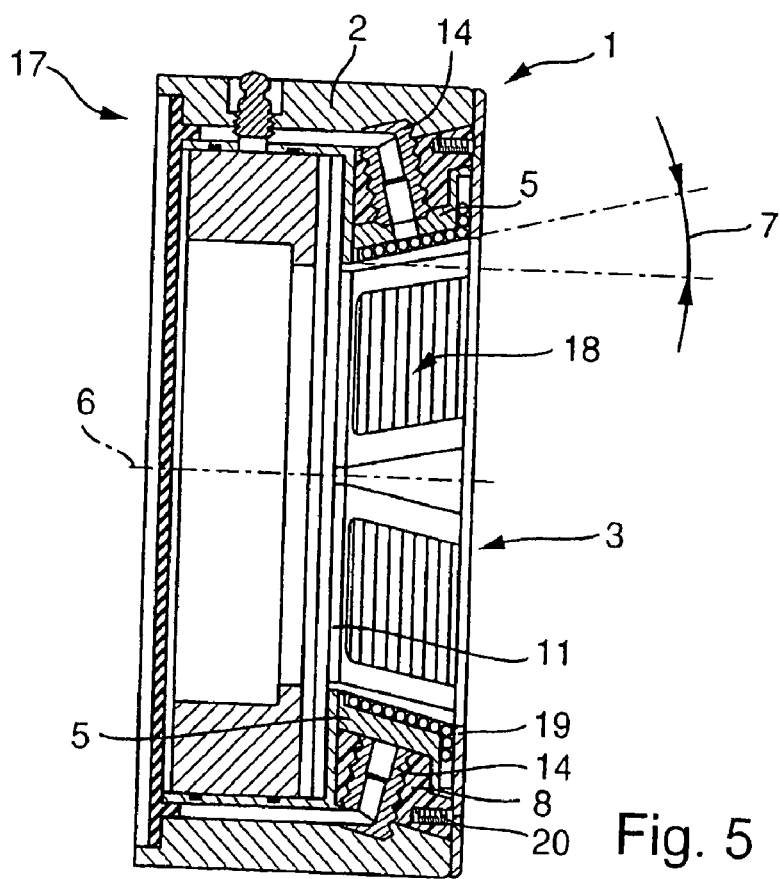
FIG. 5 A planar sectional representation of the chucking device of FIG. 4.

The sectional representation of FIG. 2 shows that the guide plates 5 have a substantially parallelogram-like cross-section and consequently are oriented with their upper faces facing inner surface 11 and the end face of housing 2 in parallel manner with respect to said surfaces and in the radial direction. FIG. 2 also shows the location of hole 4 and the design of spindle flange 17. FIG. 3 shows the lubrication holes 15 in housing 2 permitting the supply of the lubricating grooves 16 via lubricating ducts 13.

For the further description of FIGS. 4 to 7, for functionally identical elements according to FIGS. 1 to 3 the same reference numerals are used. Diverging from the chucking device 1 shown in FIGS. 1 to 3, in the chucking device 1 shown in FIGS. 4 and 5 there is an arrangement of rolling bodies 18 on guide plates 5. The rolling bodies 18 are in the form of rolling body mats and are interconnected by an elastic material, for example rubber. To achieve a fixing of the rolling body mats, a cover plate 19 is provided and is frontally applied to the chucking device 1 and fixed using screws 20. To achieve a particularly advantageous orientation of rolling bodies 18, the guide plates 5 are equipped with pocket-like depressions for receiving the rolling bodies 18 held in the rolling body mats. Apart from fastening the rolling body mats, cover plate 19 also protects the connecting means 8 against mechanical influences and aggressive coolants and/or lubricants.

Figure 6:
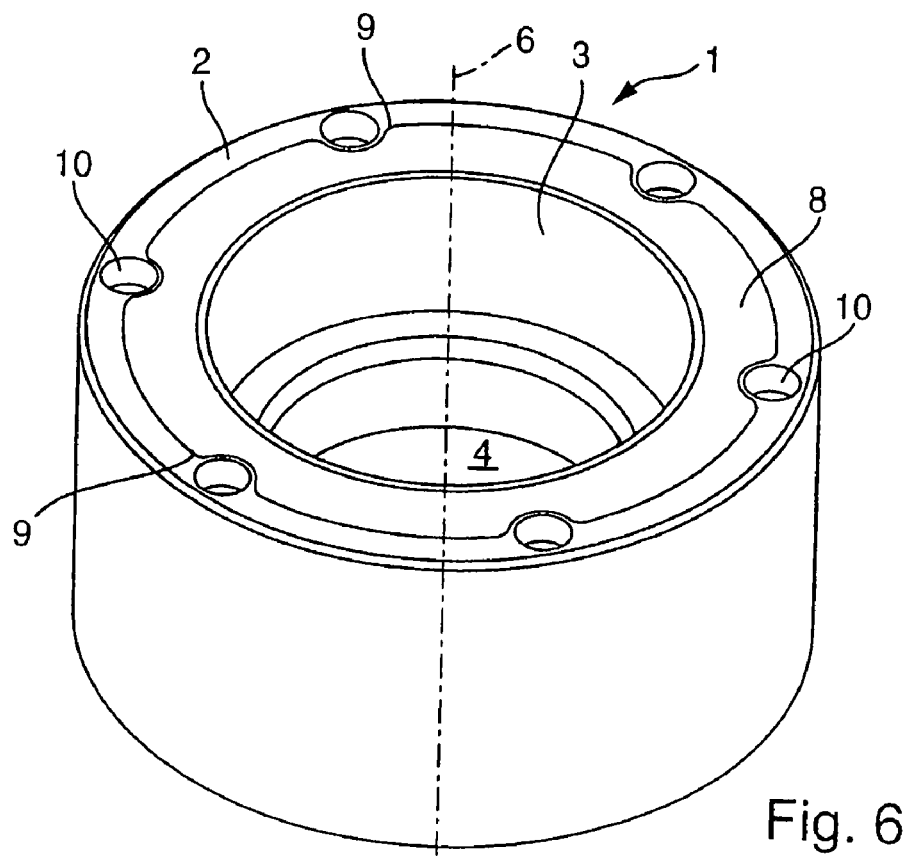
FIG. 6 A chucking device with a truncated frustum-like inner contour of the chucking tool receptacle in a perspective representation similar to FIG. 1.

The chucking device 1 shown in FIG. 6 differs from the embodiments of FIGS. 1 to 5 through a truncated cone-shaped inner contour of the chucking tool receptacle 3. This contour makes it possible to receive conventional collet chucks and therefore has a particularly advantageous universal application. From the outer contour the chucking tool receptacle is advantageously circular or conical. In order to bring about an improved self-closure with the connecting means or polymer concrete 8, the outer contour of the chucking tool receptacle 3 can also have a different configuration, for example can be polygonal and pyramidal frustum-like or equipped with projections/recesses. This assists an advantageous transmission of torques from the chucking tool receptacle 3 to connecting means 8 and therefore once again to housing 2.

Manufacturing Method

Figure 7:
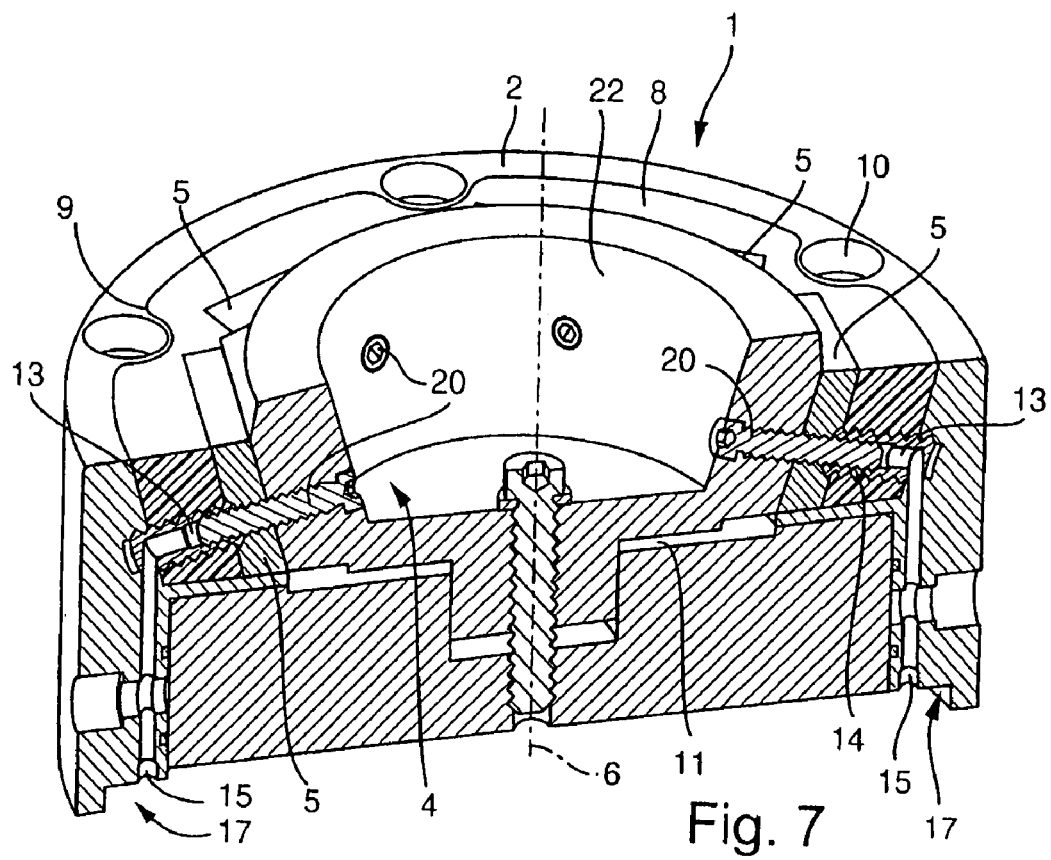
FIG. 7 A perspective section through the chucking tool receptacle with inserted positioning device and guide plates fixed thereto.

For manufacturing an inventive chucking device 1 according to FIG. 7, firstly the housing 2 is produced. In the above-described embodiments the housing 2 is made from a metallic material, for example tool steel using a milling method, i.e. the reception area in housing 2 is formed by cutting. Subsequently holes or receptacles are made for the oil cups 14 on the inside of housing 2.

Subsequently the oil cups 14, as lock nuts for screws 20, are formed on the back of guide plates 5. The screws 20 are passed through holes in the positioning device 22, which has an outer contour corresponding to the number and orientation of guide plates 5, and are screwed into the oil cups 14. For each guide plate there is at least one screw 20 or screw coupling. This leads to a firm, precisely oriented union of positioning device 22 and guide plates 5.

Then the positioning device 22 with guide plates 5 is brought into housing 2 and positioned as accurately as possible for which purpose not shown auxiliary means are used. Thus, the represented engagement of the oil cup 14 in the recesses in the inside of housing 2 can for example be so precise that it serves for positioning purposes. The polymer concrete can now be introduced into the gap formed by the boundaries of the reception area and the guide plates 5, as well as positioning device 22 and housing 2.

Following the complete hardening of the polymer concrete the positioning device 22 is used as a connection member for the machine spindle of a turning machine or lathe, so that on housing 2 can be applied the spindle flange 17 and other geometries in precise orientation with respect to the guide surfaces. This ensures that there is a particularly precise reference of the polygonal inner contour of the chucking tool receptacle 3 with respect to spindle flange 17 and consequently the concentricity and planarity tolerance of the chucking device is particularly good. The positioning device can then be removed and an operating device inserted in hole 4. After removing the screws from the oil cups 14 finish-machining of the chucking device can take place. Advantageously the lubrication holes 15 are then made in housing 2 and oil cups 14 from the spindle flange. The chucking device 1 is then complete and can then be finish-machined.

The invention claimed is:

1. A chucking device comprising: a housing; and a chucking tool receptacle received within a reception area in said housing, wherein a gap is provided between said housing and said chucking tool receptacle, the gap located radially outwards from said chucking tool receptacle, wherein said chucking tool receptacle is a separate component connected to said housing by connecting means, wherein the connecting means are made up of a temporarily flowable connecting means material that is introduced into the gap between said housing and said chucking tool receptacle in a liquid or pasty form and which is solid in the final chucking device such that the housing and chucking tool receptacle are integrally bound by the connecting means, and wherein said gap between said housing and said chucking tool receptacle is completely filled with said connecting means.

2. The chucking device according to claim 1, wherein said chucking device is a chuck for receiving a collet chuck.

3. The chucking device according to claim 1, wherein a material of said connecting means has a higher damping than a material of said housing or said chucking tool receptacle.

4. The chucking device according to claim 1, wherein a material of said connecting means has a lower density than a material of said housing or said chucking tool receptacle.

5. The chucking device according to claim 1, wherein said housing or said chucking tool receptacle substantially surrounds said connecting means.

6. The chucking device according to claim 1, wherein said connecting means or said housing form an end face and said chucking tool receptacle terminates substantially flush with said end face.

7. The chucking device according to claim 1, wherein said connecting means at least partially are made from non-metallic material.

8. The chucking device according to claim 7, wherein said connecting means comprise polymer concrete.

9. The chucking device according to claim 1, wherein said chucking tool receptacle has an outer contour and said chucking tool receptacle on said outer contour is constructed for form-closed connection to said connecting means.

10. The chucking device according to claim 9, wherein said outer contour of said chucking tool receptacle has an at least sectionally polygonal shape.

11. The chucking device according to claim 1, wherein said housing has an inner contour and said housing on said inner contour is constructed for form-closed connection to said connecting means.

12. The chucking device according to claim 11, wherein said inner contour of said housing has an at least sectionally polygonal shape.

13. The chucking device according to claim 1, wherein said chucking tool receptacle has an end side and on said end side, said chucking tool receptacle has a supporting surface for supporting with respect to said housing in an axial direction of said housing.

14. The chucking device according to claim 13, wherein said supporting surface is at least sectionally circular.

15. The chucking device according to claim 1, wherein said chucking tool receptacle has a truncated cone-shaped inner contour.

16. The chucking device according to claim 1, wherein said chucking tool receptacle has a polygonal inner contour.

17. The chucking device according to claim 16, wherein said polygonal inner contour is in the form of a pyramidal frustum, with at least three pyramidal frustum surfaces.

18. The chucking device according to claim 17, wherein said pyramidal frustum surfaces are constructed as separate guide plates.

19. The chucking device according to claim 17, wherein said pyramidal frustum surfaces are constructed for receiving rolling elements of a rolling bearing.

20. The chucking device according to claim 1, wherein said chucking tool receptacle has lubricating ducts.

21. The chucking device according to claim 20, wherein lubrication holes are provided in said housing and said lubricating ducts terminate at said chucking tool receptacle and are constructed for being supplied with lubricant by means of said lubrication holes.

22. The chucking device according to claim 21, wherein said lubrication holes are used for fixing said chucking tool receptacle whilst making said connection with said connecting means.

23. The chucking device according to claim 1, wherein said housing is at least partly formed as a wound body of a carbon fibre-reinforced plastics material.

24. Method for the manufacture of a chucking device according to claim 1, with the steps of: providing a chucking tool receptacle, a housing and a connecting means material positioning said chucking tool receptacle relative to said housing with a gap between said housing and said chucking tool receptacle filling said gap with a connecting means material.

25. Method according to claim 24, wherein said connecting means material is at least partly flowable.

26. Method according to claim 24, wherein a positioning device is provided and said positioning device is used for positioning said chucking tool receptacle relative to said housing.

27. Method according to claim 26, wherein guide plates are provided for forming said chucking tool receptacle and said guide plates are prefixed on said housing and oriented by said positioning device.

28. Method according to claim 26, wherein said positioning device is used as an interface for a further machining of contours of said chucking device.

* * * * *